United States Patent [19]

Spencer

[11] 4,133,909

[45] Jan. 9, 1979

[54] RADIATION CURABLE AQUEOUS COATINGS

[75] Inventor: Arthur T. Spencer, New Providence, N.J.

[73] Assignee: Mobil Oil Corporation, New York, N.Y.

[21] Appl. No.: 762,699

[22] Filed: Jan. 26, 1977

[51] Int. Cl.$^2$ .............................................. C08F 8/00
[52] U.S. Cl. ................................ 427/54; 204/159.15;
204/159.16; 204/159.19; 260/29.2 UA;
260/29.4 UA; 260/29.6 NR; 260/861; 260/885;
427/44
[58] Field of Search ...................... 204/159.16, 159.15;
260/29.6 NR, 861, 29.2 UA, 29.4 UA; 427/44,
54

[56] References Cited

U.S. PATENT DOCUMENTS

| | | | |
|---|---|---|---|
| 3,499,855 | /1970 | Roper | 260/29.2 UA X |
| 3,628,963 | /1971 | Akamatsu et al. | 204/159.16 X |
| 3,740,353 | 6/1973 | Patrick et al. | 260/29.2 UA X |
| 3,856,644 | 12/1974 | Traenckner et al. | 204/159.15 |
| 3,939,110 | 2/1976 | Colberg et al. | 260/29.6 ME |
| 3,992,276 | 11/1976 | Powanda et al. | 204/159.16 |

*Primary Examiner*—Richard B. Turer
*Attorney, Agent, or Firm*—Charles A. Huggett; James F. Powers, Jr.

[57] ABSTRACT

High solids, low viscosity, radiation curable, aqueous coatings compositions are provided by adding a small proportion of water to a polyethylenically unsaturated resin, preferably a liquid polyester containing acrylate groups and carboxyl functionality enabling improved dispersibility with water in the presence of a base, and a water soluble monoethylenically unsaturated monomer selected from acrylamide and N-methylol acrylamide is added to lower the viscosity of the composition and also to improve the cure. An ultraviolet photosensitizer, such as benzophenone, is added, preferably together with a tertiary amine cosensitizer, to enable ultraviolet cure.

13 Claims, No Drawings

RADIATION CURABLE AQUEOUS COATINGS

The present invention relates to high solids ultraviolet curable aqueous coating compositions in which water soluble ethylenically unsaturated monomers are added to reduce the viscosity and improve the cure.

In accordance with this invention, a high solids, low viscosity, radiation curable, aqueous coating composition is provided by adding a small proportion of water to a polyethylenically unsaturated resin, which is preferably a liquid to minimize the proportion of water which is needed. A proportion of a water soluble monoethylenically unsaturated monomer selected from acrylamide and N-methylol acrylamide is incorporated in the water-containing system to lower the viscosity and to improve the cure. An ultraviolet photosensitizer, such as benzophenone, preferably together with an amine cosensitizer, is incorporated to enable the preferred radiation cure to take place, namely, an ultraviolet cure. The result is to reduce the viscosity so as to have an easily appliable (sprayable) liquid at maximum solids content and the ultraviolet cure is improved as evidenced particularly by improved insolubility in organic solvents.

Referring first to the polyethylenically unsaturated resin, any solvent soluble nongelled polymer containing hydroxy functionality and having the capacity to tolerate a small amount of water, especially in the presence of an amine, can be reacted with, usually by condensation, a monoethylenically unsaturated monomer carrying a reactive group, especially the N-methylol group, such as N-methylol acrylamide, to incorporate a plurality of ethylenically unsaturated groups in the polymer, these preferably being acrylate groups. The result is a preferably liquid polyethylenically unsaturated resin which is selected for its capacity to accept a small proportion of water. This is especially conveniently achieved by the presence in the resin of either water miscible components, such as polyoxyethylene groups or carboxyl groups or both. The water miscibility of the carboxyl group requires the presence of a small amount of salt forming base, but this is normally present as a cosensitizer, tertiary amines being preferred. The presence of the water allows the incorporation of a proportion of a water soluble monoethylenic monomer from the group of acrylamide and N-methylol acrylamide, and these reduce the viscosity and aid the preferred ultraviolet cure.

The preferred polyethylenically unsaturated resins are based on liquid hydroxy functional polyesters which, as is well known, are polyesterification reaction products of polycarboxylic acids with polyalcohols, especially diols. Oil-free polyesters are preferred, particularly those containing from about 15%–50%, preferably from about 25%–40%, of a polyethylene glycol component having an average molecular weight of about 200-2000, preferably about 400-1000, to facilitate the capacity of the polyester to accept a small proportion of water. A small acidity, normally represented by an acid number of at least about 20, is also helpful where tertiary amines or other salt-forming base is used, and the less the resin is intrinsically miscible with water, the more acidity is required to permit acceptance of the water in the presence of the base.

The proportion of water is minimized since it is desired to employ coating compositions having the highest possible resin solids content. On the other hand, it is sometimes desirable to increase the proportion of water soluble monoethylenic monomer which is employed, and the more water, the more of such monomer can be utilized. Broadly, this invention contemplates the presence of about 4% to about 30% of water, based on the weight of the resin. Preferred proportions are from about 10% to about 25%, on the same basis.

The water is essential for, without it, it is very difficult to obtain the excellent application properties which are achieved herein. The water evaporates, and as will be apparent, it introduces no hazard, pollution, or cost. The heat of the usual ultraviolet lamps is adequate to evaporate the small amount of water which is present.

The water soluble monoethylenically unsaturated monomer which is used in this invention is either acrylamide or N-methylol acrylamide. When these are incorporated in the compatible mixture of polyethylenically unsaturated resin and water, the viscosity is significantly reduced. Normally, about 5% of such monomer will provide a noticeable reduction in viscosity, but it is usually preferred to employ larger amounts, generally at least 10%, and more preferably from about 20% to about 60%, the said proportions being based on the weight of the polyethylenically unsaturated polyester resin. Higher amounts up to about 100%, on the same basis, may be used, but this is not preferred.

In addition to reducing the viscosity of the system, which serves to render the coating compositions more easily applicable, as by spraying, the presence of the acrylamide also serves to improve the ultraviolet cure in the presence of air. This is conveniently measured by noting the solvent resistance of the cured coating. It is found herein that the capacity of the cured coating to resist organic solvents, typified by the number of double rubs with methyl ethyl ketone to remove the coating, is significantly benefitted regardless of whether or not the ultraviolet cure is supplemented by baking.

The coating compositions of this invention are intended to be cured by exposure to radiation. Ionizing radiation, such as electron beam radiation, may be used, but it is particularly preferred to employ ultraviolet radiation for the cure because of its convenience, and also because it can be carried out in the presence of air. The coatings of this invention may be applied clear or pigmented, but as is well known, certain pigments or heavy pigments can render the ultraviolet cure difficult, in which case it is preferred to employ ionizing radiation.

Any base may be employed to benefit the water acceptance of the polyethylenically unsaturated resin. Amines are particularly preferred, and tertiary amines are especially beneficial. In this invention it is desired that the amine separately participate in the cure and therefore a tertiary amino acrylate will be used as illustrative, thereby providing a reactive cosensitizer for the preferred ultraviolet radiation, and also serving to form quaternary ammonium salts with the acidity of the polyethylenically unsaturated resin which is helpful to water miscibility.

The photosensitizer which is used to render the system sensitive to ultraviolet light is itself conventional, ketonic photosensitizers being particularly preferred. Benzoin ethers, such as benzoin isobutyl ether or benzoin isopropyl ether may be used. Phenyl ketones are particularly preferred, especially benzophenone. 4'-t-butyl-2,2,2-trichloroacetophenone will further illustrate useful phenyl ketones.

The invention will be illustrated in the examples which follow. In these examples, and throughout this specification and claims, all parts are by weight unless otherwise specified.

EXAMPLE 1

A typical polyester useful in this invention is made as follows:

| Parts | Component |
|---|---|
| 348 | neopentyl glycol |
| 500 | polyethylene glycol (average molecular weight = 600) |
| 160 | trimethylol propane |
| 222.7 | isophthalic acid |
| 294 | adipic acid |
| 50 | toluene |

A mixture of the above is cooked at a temperature of 210° C. for a period of from 3 to 4 hours until the acid number is below 5. The toluene is then stripped off and the mixture is cooled to provide a liquid polyester.

EXAMPLE 2

400 parts of the hydroxy functional polyester resin of Example 1 are reacted with 46 parts of trimellitic anhydride by cooking at 120° C. for 1 hour. The reaction is a simple addition reaction which introduces carboxyl functionality to assist miscibility with water. 200 parts of toluene, 33 parts of N-methylol acrylamide and 0.25 parts of phenothiazine (antioxidant) are added and the mixture is cooked at 119°–120° C. until 5 parts of water are removed. 34 parts of N-methylol acrylamide are then added and 6 more parts of water are removed, the temperature being maintained, and then 34 more parts of N-methylol acrylamide together with 0.25 parts of phenothiazine are added and cooking is continued to remove 6.8 parts of water.

A vacuum is then applied at 119° C. to strip off the toluene. The product is a polyethylenically unsaturated liquid resin which can accept water in the presence of a base, particularly dimethyl aminoethyl acrylate.

EXAMPLE 3

The acidic polyester polyacrylate of the previous example is then combined with amine and water to provide a dispersion containing 1.8% benzophenone, 7.1% water and 3% dimethyl aminoethyl acrylate. This dispersion is coated on a substrate and cured in the absence of added water soluble monomer and in the presence of such monomer to provide the following comparative properties.

TABLE

| Water Soluble Monomer and Proportions (note 1) | Viscosity (Centipoise) | Ultraviolet Cure Methyl Ethyl Ketone Rubs (note 2) | Ultraviolet Cure + Bake Methyl Ethyl Ketone Rubs (note 3) |
|---|---|---|---|
| none | 230 | 5 | 9 |
| acrylamide 14% | 135 | 8 | 27 |
| acrylamide 25% | 110 | 59 | 100 |
| acrylamide 51% | 55 | 100 | 100 |
| N-methylol acrylamide 25% | 150 | 9 | 100 |
| N-methylol acrylamide 51% | 110 | 62 | 100 |

Note 1 - based on polyester polyacrylate resin
Note 2 - passed beneath two focused 200 watts per inch ultraviolet lamps at a speed of 25 feet per minute
Note 3 - post baked 3 minutes at 350° F.

In all instances, the weight loss on ultraviolet cure is in the range of 1–5%, and the weight loss after subsequent baking is in the range of 19–25%. The lowering of viscosity, and the improvement in solvent resistance is marked as can be seen.

I claim:

1. A method of coating comprising applying to a substrate a wet coating of a high solids, low viscosity, radiation curable, coating composition comprising, a polyethylenically unsaturated resin, from about 4% to about 30% of water in compatible mixture with said resin, and at least 5% of a water soluble monoethylenically unsaturated monomer selected from acrylamide and N-methylol acrylamide dissolved in the water, said percentages being based on the weight of the resin, and subjecting said wet coating to radiation to cure the same.

2. A method as recited in claim 1 in which said polyethylenically unsaturated resin contains carboxyl functionality and a base is present to enhance miscibility with water.

3. A method as recited in claim 2 in which said polyethylenically unsaturated resin is a liquid hydroxy functional polyester resin having hydroxy groups reacted with an acrylic monomer to provide acrylate groups therein.

4. A method as recited in claim 3 in which said polyester resin includes a polyethylene glycol component and an acid number of at least about 20.

5. A method as recited in claim 3 in which said water soluble monomer is acrylamide.

6. A method as recited in claim 3 in which said water soluble monomer is N-methylol acrylamide.

7. A method as recited in claim 1 in which said coating composition includes a photosensitizer.

8. A method as recited in claim 7 in which said photosensitizer is a ketonic photosensitizer.

9. A method as recited in claim 8 in which said photosensitizer is benzophenone.

10. A method as recited in claim 8 in which said coating composition includes a tertiary amine cosensitizer.

11. A method as recited in claim 1 in which said coating composition contains from about 10% to about 25% of water and at least about 10% of said water soluble monomer is present.

12. A high solids, low viscosity, ultraviolet curable, coating composition comprising, a polyethylenically unsaturated resin which is a liquid polyester polyacrylate having an acid number of at least about 20, from about 10% to about 25%, of water incorporated in said resin with the aid of a tertiary amine, a phenyl ketone photosensitizer, and at least 10% of a water soluble monoethylenically unsaturated monomer selected from acrylamide and N-methylol acrylamide dissolved in the water, said percentages being based on the weight of the resin.

13. A coating composition as recited in claim 12 in which said polyester is an oil-free hydroxy functional polyester including from about 15% to about 50% of a polyethylene glycol component having an average molecular weight of about 200–2000, said polyacrylate groups being provided by condensation of hydroxy groups in said polyester with N-methylol acrylamide.

* * * * *